United States Patent [19]

Edelman et al.

[11] 4,364,993
[45] Dec. 21, 1982

[54] SIZED CARBON FIBERS, AND THERMOPLASTIC POLYESTER BASED COMPOSITE STRUCTURES EMPLOYING THE SAME

[75] Inventors: Robert Edelman, Staten Island, N.Y.; Paul E. McMahon, North Plainfield; Gene P. Daumit, Berkeley Heights, both of N.J.

[73] Assignee: Celanese Corporation, New York, N.Y.

[21] Appl. No.: 167,987

[22] Filed: Jul. 14, 1980

[51] Int. Cl.$^3$ .......................... B05D 5/10; C08K 7/06; C09J 3/16; D04H 1/58

[52] U.S. Cl. .................... 428/288; 156/330; 156/331.4; 428/367; 428/408; 428/902; 528/67

[58] Field of Search ............. 428/367, 408, 902, 288; 528/67; 156/331.4, 326, 330

[56] References Cited

U.S. PATENT DOCUMENTS

| | | | |
|---|---|---|---|
| 2,430,479 | 11/1947 | Pratt | 156/331.4 |
| 2,876,725 | 3/1959 | Buck | 156/332 |
| 3,563,849 | 2/1971 | Rye | 428/395 |
| 3,600,289 | 8/1971 | Bragole | 156/331.4 |
| 3,703,426 | 11/1972 | Larson | 156/308 |
| 3,770,691 | 11/1973 | McLoughlin | 260/37 N |
| 3,806,489 | 4/1974 | Rieux | 260/38 |
| 3,914,504 | 10/1975 | Weldy | 428/367 |
| 3,945,876 | 3/1976 | Bianca | 428/423.7 |
| 4,107,128 | 8/1978 | Hosoi | 428/367 |
| 4,145,472 | 3/1979 | Spain | 428/367 |
| 4,163,003 | 7/1979 | Paul | 428/367 |
| 4,166,873 | 9/1979 | Gilliam | 156/332 |
| 4,219,457 | 8/1980 | Taniguchi | 428/367 |

FOREIGN PATENT DOCUMENTS

| | | | |
|---|---|---|---|
| 55-90551 | 7/1980 | Japan | 428/367 |
| 1228573 | 4/1971 | United Kingdom | 428/367 |
| 1358276 | 7/1974 | United Kingdom | 428/367 |

*Primary Examiner*—Dennis L. Albrecht
*Attorney, Agent, or Firm*—Burns, Doane, Swecker & Mathis

[57] ABSTRACT

The present invention is directed to carbon fibers which are coated on the surface with a sizing agent of either a polyisocyanate, such as polymethylene polyphenyl polyisocyanate, or a sorbitol polyglycidyl ether having a specifically defined total chlorine content and epoxide equivalent weight. The coated carbon fibers are employed to prepare carbon fiber composites wherein the matrix resin is a thermoplastic polyester such as poly(1,4-butylene terephthalate). The matrix resin of the composite exhibits improved bonding with the coated carbon fibers thereby imparting improved interlaminar shear strength to the composite.

7 Claims, No Drawings

SIZED CARBON FIBERS, AND THERMOPLASTIC POLYESTER BASED COMPOSITE STRUCTURES EMPLOYING THE SAME

BACKGROUND OF THE INVENTION

Carbon fiber composites wherein carbon fibers are included in a synthetic resin matrix are well known in the art. The function of the resin matrix is primarily to give the composite the required external dimension and shape, while the carbon fibers provide the composite with the required strength and stiffness.

Thermoplastic polymers, which are solids at the intended use temperature of the composite such as polyesters, have been employed as the resin matrix as illustrated by British patent specification No. 1,228,573. Thermoplastic resins possess the advantage of not requiring partial curing after impregnation of the carbon fibers. When a thermoplastic polymer, such as polybutylene terephthalate, is employed as the resin matrix, however, the bonding between the carbon fiber and matrix is often poor as manifested by the mechanical strength properties, e.g., interlaminar shear strength of the composite.

Improved bonding between the carbon fibers and matrix resins in general has been accomplished in the past by a number of techniques such as by plating the carbon fibers with various metals including tantalum, metal carbides and nitrates, and by etching the surface of the carbon fibers with oxidizing agents such as air, ozone, concentrated nitric acid and chromic-sulfuric acid. Block and graft copolymers have also been used to improve bonding between the carbon fibers and the matrix as illustrated by U.S. Pat. No. 3,855,174 Carbon fibers have also been coated with a variety of sizing agents such as epoxy resins for a number of reasons, such as to prevent snagging and fraying of the carbon filers as illustrated by U.S. Pat. Nos. 3,373,984; 3,806,489; 3,908,042; 3,914,504; 3,953,641; 3,971,669; 4,145,472 and British Patent Specification No. 1,-195,219.

When the epoxy resins typically employed as sizing agents such as the diglycidyl ethers of Bisphenol A are employed in making carbon fiber composites wherein the matrix resin is polybutylene terephthalate, however, the interlaminar shear strength of said composites are not as high as one would desire to meet certain practical requirements of the carbon fiber composites.

It is therefore an object of the present invention to improve the bond between the carbon fiber surfaces and certain thermoplastic polyesters employed as the resin matrix.

It is another object of the present invention to provide carbon fibers coated with a sizing agent which can be employed in combination with certain thermoplastic polyester matrix resins to prepare carbon fiber composites which exhibit improved interlaminar shear strength and acceptable flexural strength.

It is a further object of the present invention to provide a carbon fiber composite with enhanced interlaminar shear strength and acceptable flexural strength.

These and other objects and features of the invention will become apparent from the claims and from the following summary and description of the preferred embodiments of the present invention.

SUMMARY OF THE INVENTION

In one aspect of the present invention there is provided a carbon fiber having coated on the surface thereof a sizing composition selected from the group consisting of (a) sorbitol polyglycidyl ethers having a total chlorine content of at least 10%, by weight, based on the weight of the sorbitol polyglycidyl ether, and an epoxide equivalent weight of from about 160 to about 230; and (b) at least one aromatic polyisocyanate selected from the group consisting of 2,6-toluene diisocyanate, 2,4-toluene diisocyanate, 4,4-diphenyl methane diisocyanate, 3,3'-dimethyl-4,4' biphenylene diisocyanate, and the polyalkylene polyphenyl polyisocyanates represented by the structural formula:

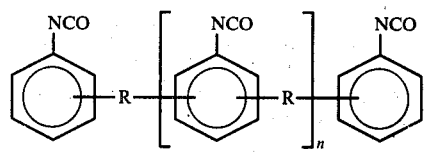

wherein R is an alkyl group having from about 1 to about 4 carbon atoms and n is an integer the average value of which is not greater than 4.

In another aspect of the present invention there is provided a composite structure comprising a continuous matrix of a thermoplastic polyester comprising a poly (alkylene terephthalate, isophthalate, or mixed terephthalate, isophthalate), said alkylene groups containing from about 2 to about 4 carbon atoms, and a reinforcing agent contiguous and firmly bonded thereto, said reinforcing agent comprising carbon fibers sized with a sizing composition described above.

DESCRIPTION OF THE PREFERRED EMBODIMENTS

In the present invention carbon fibers are coated with a sizing agent or composition selected from the group consisting of sorbitol polyglycidyl ethers and polyisocyanates. Such sized carbon fibers are then employed to prepare composite structures as defined herein. The term size is used herein to distinguish the fiber coating from the impregnating resin which constitutes the matrix of the composite. Composites prepared using the sized carbon fibers and certain thermoplastic polyester matrix resins exhibit improved adhesion between the carbon fibers and the resin constituting the matrix of the composite structure as reflected by improved interlaminar shear strength of the same.

The sorbitol polyglycidyl ethers which can be used in accordance with this invention are prepared by the reaction of sorbitol and epichlorohydrin and have a total chlorine content of at least about 10%, preferably from about 11 to about 20%; and most preferably from about 11.5 to about 17% by weight thereof.

The requisite chlorine content is achieved by controlling the molar ratio of epichlorohydrin to sorbitol as well as the reaction conditions as is well known in the art.

Illustrative examples of the resulting sorbitol polyglycidyl ethers can be represented by the structural formula:

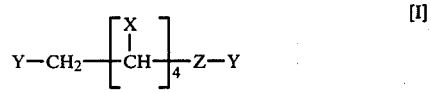

[I]

wherein X which can be the same or different represents a monovalent substituent selected from the group consisting of hydroxy; 2,3-epoxy propoxy (i.e.,

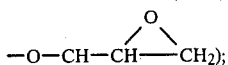

and 2-(2,3-epoxy propoxy)-3-chloro-propoxy (i.e.,

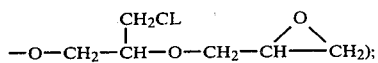

Y which can be the same or different represents a monovalent substituent selected from the group consisting of 2,3-epoxy propoxy, and 2-(2,3-epoxy propoxy)-3-chloro-propoxy with at least one Y group being 2-(2,3-epoxy propoxy)-3-chloro-propoxy; and Z represents either a methylene group (i.e., —CH$_2$—) or hydroxy methylene (i.e.,

Thus, the sorbitol polyglycidyl ethers are defined by the total chlorine content and the epoxide equivalent weight thereof.

The epoxide equivalent weight of the sorbitol polyglycidyl ethers can vary from about 160 to about 230, typically from about 165 to about 220 and most preferably from about 170 to about 200.

The sorbitol polyglycidyl ethers are believed to achieve the improved bonding with the thermoplastic polyester described herein as a result of the combined presence of epoxy groups and polar chlorine groups.

The polyisocyanate sizing agent includes aromatic polyisocyanates containing at least two isocyanate groups wherein the isocyanate groups are attached to the aromatic ring. Suitable aromatic polyisocyanates include 2,6-toluene diisocyanate; 2,4-toluene diisocyanate; 4,4'-diphenyl methane diisocyanate; 3,3'-dimethyl-4,4'-biphenylene diisocyanate and the polyalklene polyphenyl polyisocyanates represented by the structural formula:

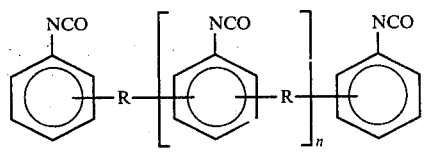

[II]

wherein R is an alkyl group having from about 1 to about 4, preferably from about 1 to about 2 carbon atoms and n is an integer whose average value is not greater than about 4, and typically can vary from about 2 to about 4.

The preferred polyisocyanate sizing agent comprises polymethylene polyphenyl polyisocyanate sometimes referred to as polyarylpolyisocyanate or by the trademark PAPI ™. Polymethylene polyphenyl isocyanate is composed of a family of low molecular weight polymers represented by structural formula (II) wherein R is methylene and the average value of n is not greater than about 4 and typically will vary from about 2 to about 4 (e.g., 3).

Compounds which generate the aforedescribed polyisocyanates may also be employed as the sizing agent.

Typical polyisocyanate generating compounds are blocked isocyanates which include all reaction products of the aforedescribed polyisocyanates and a compound having a hydrogen reactive with the isocyanate group. Examples of the blocking compounds include monohydroxy compounds, especially primary and secondary alcohols, details of preparation being disclosed in U.S. Pat. Nos. 2,952,665 and 3,325,333, amines including urea, primary and secondary mono and polyhydric phenols including phenol and resorcinol (when phenol is used to block "PAPI," the resulting compound is known by the trademark "Hylene MP" as more fully described in "Adhesives Age," 2, 30–33 (1959)), amides as well as lactams, details of preparation being disclosed in Belgian Pat. No. 665,474, (when caprolactam is used to block "PAPI" the resulting compound is known by the trademark "Isonate" 123P). For a more detailed description of blocked isocyanates, see U.S. Pat. No. 3,563,849 the disclosure of which is herein incorporated by reference.

The particular blocked isocyanate selected must become unblocked and release the polyisocyanate at the temperatures employed in the drying oven used to evaporate the solvent containing the sizing agent as described herein.

Accordingly, the term "polyisocyanate" includes both polyisocyanates per se as well as a polyisocyanate generating agent.

The carbon fibers which are coated with the sizing agent are well known in the art.

The terms "carbon" fibers or "carbonaceous" fibers are used herein in the generic sense and include graphite fibers as well as amorphous carbon fibers which result after a thermal carbonization or graphitization treatment. Graphite fibers are defined herein to consist substantially of carbon and have a predominant X-ray diffraction pattern characteristic of graphite. Amorphous carbon fibers, on the other hand, are defined as fibers in which the bulk of the fiber weight can be attributed to carbon and which exhibit a predominantly amorphous X-ray diffraction. Graphite fibers generally have a higher Young's modulus than do amorphous carbon fibers and in addition are more highly electrically and thermally conductive. Numerous procedures have been employed for the conversion of various organic polymeric fibrous materials to a carbonaceous form while retaining the original fibrous configuration essentially intact. Such procedures have in common the thermal treatment of a fibrous precursor in an appropriate atmosphere or atmospheres which is commonly conducted in a plurality of heating zones, or alternatively in a single heating zone wherein the fibrous material is subjected to progressively increasing temperatures. See, for instance, U.S. Pat. No. 3,539,295 for a representative conversion process the disclosure of which is herein incorporated by reference.

More specifically, organic polymeric precursor fibrous materials of the type described herein may be initially stabilized by treatment in an appropriate atmosphere at a moderate temperature (e.g., 200° to 400° C.), and subsequently heated in an inert atmosphere at a more highly elevated temperature, e.g., 900° to 1,000° C., or more, until a carbonaceous fibrous material is formed. If the thermally stabilized material is heated to a maximum temperature of 2,000° to 3,100° C. (preferably 2,400° to 3,100° C.) in an inert atmosphere, substantial amounts of graphite carbon are commonly detected in the resulting carbon fiber, otherwise the carbon fiber will commonly exhibit a substantially amorphous X-ray diffraction pattern.

The exact temperature and atmosphere utilized during the initial stabilization of an organic polymeric fibrous material commonly vary with the composition of the precursor as will be apparent to those skilled in the art. During the carbonization reaction elements present in the fibrous material other than carbon (e.g., oxygen and hydrogen) are substantially expelled. Suitable organic polymeric fibrous materials from which the carbon fibers may be derived include an acrylic polymer, a cellulosic polymer, a polyamide, a polybenzimidazole, polyvinyl alcohol, pitch, etc. Acrylic polymeric materials are particularly suited for use as precursors in the formation of the carbon fibers. Illustrative examples of suitable cellulosic materials include the natural and regenerated forms of cellulose, e.g., rayon. Illustrative examples of suitable polyamide materials include the aromatic polyamides, such as nylon 6T, which is formed by the condensation of hexamethylenediamine and terephthalic acid. An illustrative example of a suitable polybenzimidazole is poly-2,2'-m-phenylene-5,5'-bibenzimidazole. Preferred carbonization and graphitization techniques for use in forming the carbon fibers are described in commonly assigned U.S. Pat. Nos. 3,667,705; 3,775,520; and 3,900,556. Each of the disclosures of these patents is herein incorporated by reference.

Carbon fibers which typically are employed in preparing the composites described herein contain at least about 90 percent carbon by weight. In a preferred embodiment, the carbon fibers contain at least about 95 percent carbon by weight and exhibit a predominantly graphitic X-ray diffraction pattern.

Carbon fibers are generally employed in the configuration of a ribbon which may comprise a single flat tow of continuous carbon filaments or a plurality of substantially parallel multifilament fiber bundles which are substantially coextensive with the length of the ribbon.

In the latter embodiment the carbon fiber bundles of the ribbon may be provided in a variety of physical configurations. For instance, the bundles of the ribbon may assume the configuration of continuous lengths of multifilament yarns, tows, strands, cables, or similar fibrous assemblages. The multifilament bundles are preferably lengths of a continuous multifilament yarn. The fiber bundles within the ribbon optionally may be provided with a twist which tends to improve their handling characteristics. For instance, a twist of about 0.1 to 5 tpi, and preferably about 0.3 to 1 tpi, may be imparted to each fiber bundle. Also, a false twist may be used instead of or in addition to a real twist. Alternatively, the fiber bundles may possess substantially no twist.

Multifilament fiber bundles may be provided within the ribbon in a substantially parallel manner in the substantial absence of bundle crossovers to produce a flat ribbon. The number of parallel multifilament bundles present within the carbon fiber ribbon may be varied widely, e.g., from 6 to 1,000 or more. In one embodiment, a ribbon is selected having a weft pick interlaced with substantially parallel fiber bundles in accordance with the teachings of commonly assigned U.S. Pat. No. 3,818,082, which is herein incorporated by reference. It is not essential, however, that the parallel fiber bundles or the filaments of a flat tow be bound by any form of weft interlacement when constructing carbon fiber tapes for resin impregnation in accordance with the procedures described herein.

Preferably, the organic polymeric fibrous precursor is arranged in the desired configuration prior to the thermal treatment. The sizing agent is applied after the thermal treatment.

When carbon fibers are to be used in preparing composite structures with resin matrix systems, they are frequently subjected to a surface pretreatment to further improve the adhesion between the carbon fibers and the resin matrix. The fiber surface is usually oxidized in such a pretreatment, for example by reaction with an oxidizing agent. Alternatively, the carbon fiber can be oxidized by electrolytic treatment using an electrolyte which will generate nascent oxygen at the surface of the carbon fiber during the electrolysis process. Preferred surface modification treatments are disclosed in commonly assigned U.S. Pat. Nos. 3,723,150; 3,723,607; 3,762,941; 3,767,774; 3,821,013; and 3,859,187 the disclosures of which are herein incorporated by reference. The sizing compositions of this invention do not detract from the adhesion improvement of such surface treated fibers.

The sizing agent can be applied to the fiber in a suitable solvent, which is non-reactive with the sizing agent, to control the amount of size coated onto the fiber. However, the sizing agent can be applied directly, if desired. It will be obvious to those skilled in the art that the presence of solvent will improve the ability of the sizing agent to penetrate into the individual fibers of a staple yarn, filament yarn, or roving. When sizing a monofilament or tow material, a solvent is usually not necessary provided the sizing agent is sufficiently fluid and properly wets the surface of the carbon fiber. The concentration of the size in the solvent is usually in the range of from about 0.75 to about 20%, and preferably from about 1 to about 10% by weight, based on the total weight of the solution. Examples of suitable solvents are polar solvents such as the halogenated hydrocarbons, including methylene chloride, and ethylene dichloride; alcohols in conjunction with glycidyl ethers, acetone, ketones and esters. The solvents are preferably anhydrous to minimize reaction with the polyisocyanates.

The preferred solvent is acetone.

Alternatively, the sizing agent can be dispersed either in an aqueous suspension or emulsion. When this method of application is employed the sizing agent must be rendered non-reactive with water, such as by employing blocked polyisocyanates. If desired, the sizing composition may also contain a lubricant. The lubricant serves to permit more even distribution of the size on the fiber and aids in more effective wetting of the fiber. Preferred lubricants are fatty acids, amides and esters. Other additives, such as coupling agents can also be added to the size solution.

The sizing compositions can be applied to the fibers by known methods, for example, by drawing the fibers through a bath containing the size or by spraying the size onto the fibers and then drying the fibers to remove any solvent. A suitable apparatus for coating the carbon fibers with the sizing agent is illustrated in U.S. Pat. No. 3,914,504 the disclosure of which is herein incorporated by reference.

Typically a carbon fiber strand, or ribbon is passed into a solution containing the sizing agent and then into a heated tube to remove the solvent and dry the fiber. The tube is heated by hot air, preferably air mixed with nitrogen to prevent fires or explosions forced through the inlet of the tube from a suitable source, such as an electric heat gun. The temperature of the heated gaseous medium is maintained sufficiently high to evaporate the solvent upon contact with the solution coated fibers. In those where blocked polyisocyanates are employed the evaporation temperature will also be controlled to achieve unblocking of the same.

The amount of sizing agent coated onto the fiber is from about 0.75 to about 10% and preferably from about 0.9 to about 8% by weight, based on the weight of the fiber. The amount of size on the fiber is determined by weighing a given length of sized fiber, then dissolving the size from the fiber using a solvent, such as acetone, for the size, drying the fiber and then reweighing the unsized fiber. From the difference in the weights the percentage of size on the fiber, based on the weight of the fiber, is calculated.

The carbon fibers coated with sizing agent described herein are intended to be used in fiber reinforced composite structures. By the term "composite structure" is meant a heterogeneous assembly comprised of two or more components, at least one of which defines a continuous phase which is hereinafter designated as the "matrix" component, and at least one other component defining reinforcing means or reinforcement for the said composite assembly, the reinforcing means being contiguous to and firmly bonded to the matrix component. For example, the respective components of such composite assemblies can be either coated, layered, stratified and/or laminated, randomly filled and the like.

Thus, the composite structures of the present invention comprise the matrix component, and the reinforcing material which comprises carbon fibers and the sizing agent described herein for the carbon fibers.

A thermoplastic polyester is used as the matrix component of the composite structure.

It has been found that the particular sizing agents described herein improve the adhesion of the carbon fiber surface with certain thermoplastic polyesters employed as the matrix component of a composite structure.

More specifically, the thermoplastic polyesters employed as the matrix component in the carbon fiber composites described herein include the poly(alkylene terephthalates, isophthalates or mixed terephthalates and isophthalates), wherein the alkylene groups contain from 2 to 4 carbon atoms. They are available commercially or can be prepared by known techniques, such as the alcoholysis of esters of the phthalic acid with a glycol and subsequent polymerization, by heating glycols with the free acids or with halide derivatives thereof, and similar processes. These are described in U.S. Pat. Nos. 2,465,319 and 3,047,539, and elsewhere.

Although the glycol portion of such typical polyesters can contain from 2 to 4 carbon atoms, e.g., ethylene, 1,3-propylene, 1,4-butylene, 1,3-butylene, 1,2-propylene, 1,2-butylene, and 2,3-butylene, it is preferred that it contain 3 or 4 carbon atoms, in the form of linear methylene chains.

Preferred polyesters will be of the family consisting of high molecular weight, polymeric 1,4-butylene glycol terephthalates or isophthalates and mixtures of such esters, including copolyesters of terephthalic acid and up to about 20% isophthalic acid.

The most preferred thermoplastic polyester is poly(1,4-butylene terephthalate).

The molecular weight of the thermoplastic polyester preferably is such that it will exhibit an inherent viscosity (I.V.) of from about 0.65 to about 1.2 dl/gm, preferably from about 0.70 to about 0.80 dl/gm, as determined from 0.1%, by weight, solution of the polymer in 100 ml. of orthochlorophenol at 25° C.

The improved adhesion between the carbon fibers and the thermoplastic polyester resin matrix is exhibited by improvements in interlaminar shear strength of the composite.

The composite fabrication technique may be selected from any of those procedures previously employed in the advanced engineering composite art. Typically a composite structure is formed by impregnating individual lamina (e.g., carbon fiber layers, ribbons, plies, etc.) of sized carbon fibers arranged in the desired configuration with the thermoplastic polyester. The impregnation of the lamina may be conducted by applying the thermoplastic polyester to the same from either a solution and preferably from the melt. The impregnated lamina are then stacked as needed and molded with conventional molding techniques. Composite structures of more complex shapes may be formed by maintaining the thermoplastic resin in a plastic state.

The composite structures will generally constitute from about 50 to about 80%, and preferably from about 65 to about 75%, by weight, sized carbon fibers and correspondingly from about 50 to about 20%, and preferably from about 35 to about 25%, by weight, thermoplastic polyester based on the weight of the composite.

The composites structures of the present invention find utility in automotive and industrial applications where rapid cycling is desirable. For example, fenders, trunk lids, bumpers, and similar light weight structural components may be formed by conventional molding or shaping techniques. Alternative uses of the aforedescribed composite include aircraft/aerospace application, as well as structural members for housing, e.g., floor beams and the like.

The invention is additionally illustrated in connection with the following Examples which are to considered as illustrative of the present invention. It should be understood, however, that the invention is not limited to the specific details of the Examples. All parts and percentages in the examples as well as the remainder of the specification are by weight unless otherwise specified.

EXAMPLE 1

Preparation of Sorbitol Polyglycidylether

Sorbitol (364.4 gms, 2 moles) and toluene (200 gms) are loaded into a five liter four necked flask fitted with an overhead mechanical stirrer, a thermometer, addition funnel and a Dean Stark trap with condenser. Over a thirty minute period the internal temperature of the flask is raised to 230° F. by means of an external heating bath. At 230° F., refluxing occurs and about 2 ml of water is collected and removed from the Dean Stark trap over a 30 minute period.

The temperature is then lowered to 210° F. and boron trifluoride diethyl etherate (7.4 gms) is added over a ten minute period. The temperature is then raised to 220° F. and epichlorohydrin, (about 8 moles) is slowly added with stirring of the flask over a one hour and twenty minute period. (At 220° F. the sorbitol is molten and mixing is done more readily.) After continuous addition for 30 minutes, some exotherming will take place. The temperature is then reduced to 160° F. and the addition continued. After the completion of the epichlorohydrin addition, toluene (800-1000 gms) is added to the reaction vessel. An aliquot of the reaction mixture is removed and is titrated for epichlorohydrin to determine the extent of the reaction.

The bath is then heated to a temperature of 140° F. and 50% aqueous sodium hydroxide (602.3 gms) is added slowly to the reaction vessel over a three hour and ten minute period. During the addition of base, vacuum is applied at the top of the condenser to facilitate the removal of water. A vacuum of about 240 mm. Hg enables the water to be removed at reduced temperature. By the time all of the base has been added approximately 200 ml of water has been distilled over. Heating at 160° F. is continued for one hour and 35 minutes additional time. Total yield of water is approximately 410 gms.

The reaction mixture is cooled and filtered. Sodium chloride and a polymeric material are separated from the product solution. The final product is separated from toluene by stripping off the latter under vacuum at 35 mm Hg. Final temperature is 300° F. for ten minutes. The product is again filtered hot to remove any remaining solids.

The above procedure is repeated with the exception that the molar ratio of epichlorohydrin:sorbitol is varied. The resulting sorbitol polyglycidyl ethers possess a varying range of properties summarized at Table I runs 1 to 6. The total chlorine content is determined experimentally by parr bomb analysis wherein the chlorine is oxidized to chloride and the same is titrated with a suitable reagent.

The average percent of add-on of sizing agent of the four tows is about 1.2% by weight based on the weight of the unsized tows for each run.

EXAMPLE 3

Example 2 is repeated with the exception that the sizing agent is polymethylene polyphenylisocyanate available under the trade name PAPI TM 580 from the Upjohn Co. PAPI TM 580 can be represented by structured formula II wherein R is methylene and the average value of n is 3.0. The PAPI TM has an NCO content of about 30%. The average add-on of sizing agent is about 0.83%.

EXAMPLE 4

Composites are fabricated with the sized carbon fibers of Example 2, said sizing agent being derived from Example 1, run 2, and Example 3, as shown at Table II runs 1 and 5 respectively, and also with untreated carbon fibers of the type employed in Example 2. The resin matrix employed for the composite is poly(1,4butylene terephthalate) having an I.V. as defined herein of 0.75 dl/gm.

More specifically, ribbons of Celion-6000 TM carbon fibers sized with the aforenoted sizing agents are passed through a bath of the aforedescribed poly(1,4-butylene terephthalate) and collected on a winding drum such that the average pattern for fiber lay down is about 14.3 tows per inch. The average weight per tow is about 0.621 gm/yd and the average PBT resin content is about 40.5%, by weight.

Because the prepreg materials contain excess resin, it

TABLE I

| Run No. | Epichlorohydrin/ Sorbitol Molar Ratio in SPGE | Chloropropoxy in SPGE (Moles) | Glycidyl ether in SPGE (Mole) | Molecular weight of SPGE | WPE of SPGE | Total Cl of SPGE (%) | Hydrolyzable Cl (%) | Brookfield viscosity at 25° C. (cps) | Residual Hydrolyzable Cl (Mole) |
|---|---|---|---|---|---|---|---|---|---|
| 1 | 4:1 | 1.31 | 2.53 | 460 | 226 | 11.3 | 1.26 | 28,000 | 0.16 |
| 2 | 4.55:1 | 1.69 | 2.79 | 501 | 180 | 12.5 | 0.48 | 32,000 | 0.07 |
| 3 | 4.9:1 | 1.8 | 3.02 | 525 | 174 | 12.7 | 0.56 | 16,000 | 0.08 |
| 4 | 6.0:1 | 2.05 | 3.92 | 594 | 176 | 13.3 | 0.2 | 16,400 | 0.03 |
| 5 | 5.53:1 | 2.17 | 3.36 | 571 | 170 | 13.5 | NA | 10,000 | NA |
| 6 | 9:1 | 4.1 | 4.82 | 839 | 212 | 17.7 | 0.33 | 74,500 | 0.08 |

SPGE = Sorbitol polyglycidyl ether.

EXAMPLE 2

Four carbon fiber tows, which have been given an oxidative surface treatment, with each tow consisting of a bundle of 6000 filaments, a total denier of about 3700, (available under the tradename Celion-6000 TM ) are employed in this example. The carbon fiber tows are derived from an acrylonitrile copolymer consisting of about 97.5 mole % acrylonitrile and about 2.5 mole % methylacrylate monomer units.

More specifically each carbon fiber tow is passed through a different solution of the sorbitol polyglycidyl ethers prepared in Example 1 runs 1 to 6 in acetone at a concentration of 1.5% by solution weight. The tows are unwound from 4 separate bobbins and passed simultaneously in the direction of their length through each sizing solution at a rate of 1 to 3 meters/min., through a pair of nip rollers set at a pressure of 50 psig. and then through an elongated tube heated with forced hot air. The tube is maintained at an oblique angle in relation to a vertical orientation and the temperature gradient within the tube varies from about 62° C. to about 130° C. Each dried tow is collected on a separate bobbin.

is necessary to reduce the resin content and the bulk factor in the plies. Bleeder plies are used to achieve this end since the flow direction of the migrating surplus resin is perpendicular to the surface and does not disturb the fiber orientations.

Consequently, the following procedure is used to make PBT/sized-fiber molding blanks used for testing. Each lay-up consists of nine plies of unidirectional (0°) prepreg of PBT/sized-fiber prepreg cut 5.5 inches wide and 8.373 inches long (drum circumference divided by nine equal increments).

The weight of each individual lay-up is recorded before wrapping in Armalon TM (double wrap). The purpose of the Armalon TM (a Teflon coated porous glass fabric available from Polymer Sales and Service, Plainview, N.Y.) is two-fold: (1) to provide the release and the porosity necessary for the resin to migrate into the bleeder plies and (2) to prevent lateral displacement of the fibers as the compaction pressure is being applied. One layer of 181 style glass fabric (112 finish) is used on each surface of the Armalon TM -wrapped prepreg assembly. With the lowered resin content obtained by using the new drawing die, only one ply of bleeder was required on each surface.

Steel cauls that are 12 inches by ¼ inch are used in pressing the blanks. Freekote 33 TM (an aerosol spray release agent) is used on the cauls for release, and spacers are used between the cauls to obtain uniform closure and to minimize platen tipping (looseness in the press guidance system). During the final phase of closure, however, these shims are removed to allow full molding pressure (50 psi) to be applied.

The processing sequence for molding blanks is as follows. The press platens and cauls are heated to 480° F. The prepared prepreg assembly is placed between the heated cauls, and the press is closed using 40 psi pressure. After the temperature of the platens has completely stabilized at the 480° F. temperature (approximately 10 min), the pressure is increased to 50 psi (2250 lbs). After five more minutes, during which the shims are removed to permit resin migration, the blank is cooled. The impregnated bleeder plies are removed and replaced with one ply of 0.003-inch-thick glass fabric on each surface before the next pressing.

The processing sequence for pressing the de-bulked mold blank into final composite form is as follows. The press platens and cauls are heated to 490° F. The Armalon-wrapped blank, with one ply of 0.003-inch-thick glass fiber on each surface, is placed between the heated cauls, and the press is closed using 40 psi pressure. After the temperature has returned to 490° F. (approximately 5 min.), it is then increased to 505° F. When the temperature has become stable (approximately 10 min.) the spacers are removed, and the pressure is increased to 50 psi (2250 lbs). Five additional minutes are allowed to permit composite stabilization (pressure, temperature, flow), and then the blank is cooled to 300° F. The bleeder plies and the Armalon TM are then removed, and the unrestrained laminate is placed in a cold press (not pressure) to finish cooling.

The resulting laminate is cut into specimen bars 0.500 inch wide by 3.75 inches long for flexural testing in accordance with ASTM D-790 and specimens 0.250 inch wide by 0.65 inch long for interlaminar shear strength in accordance with ASTMD-344. All testing is conducted at room temperature.

Several other sample composite bars are prepared using different sizing agents as shown at Table II, runs 2-4 and tested as described above. The results are summarized at Table II.

As may be seen from the data of Table II the composites employing carbon fibers sized with the SPGE and PAPI-580 TM evidence superior interlaminar shear strength and good flexural strength.

in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. At least one carbon fiber having coated on the surface thereof a sizing composition of sorbitol polyglycidyl ether having a total chlorine content of at least 10%, by weight, based on the weight of the sorbitol polyglycidyl ether, and an epoxide equivalent weight of from about 160 to about 230.

2. The sized carbon fiber of claim 1 wherein the sizing composition comprises from about 0.75 to about 10%, by weight, based on the carbon fiber weight.

3. The sized carbon fiber of claim 2 wherein the sizing composition is a sorbitol polyglycidyl ether having a total chlorine content of from about 11 to about 20%, by weight, based on the weight of the sorbitol polyglycidyl ether and an epoxide equivalent weight of from about 165 to about 220.

4. A composite structure comprising a continuous matrix of a thermoplastic polyester comprising a poly (alkylene terephthalate, isophthalate, or mixed terephthalate, isophthalate), said alkylene groups containing from about 2 to about 4 carbon atoms, and a reinforcing agent contiguous and firmly bonded thereto, said reinforcing agent comprising carbon fibers sized with a sizing composition of sorbitol polyglycidyl ether having a total chlorine content of at least 10%, by weight, based on the weight of the sorbitol polyglycidyl ether and an epoxide equivalent weight of from about 160 to about 230.

5. The composite structure of claim 4 wherein said reinforcing agent is distributed throughout the continuous matrix, the sizing composition is present on said fibers in an amount of from about 0.75 to about 10%, by weight, based on the weight of said carbon fibers, and wherein the composite structure comprises from about 50 to about 80% by weight sized carbon fibers and correspondingly from about 50 to about 20%, by weight, thermoplastic polyester-matrix, based on the weight of the composite structure.

6. The composite structure of claim 4 or 5, wherein the thermoplastic polyester comprises poly (1,4-butylene terephthalate).

7. The composite structure of claim 6 wherein the carbon fibers are sized with a sorbitol polyglycidyl ether having a total chlorine content of from about 11 to about 20% and an epoxide equivalent weight of from about 165 to about 220.

TABLE II

| | Run No. | Sizing Agent | Average % Add-on of Sizing Agent | Fiber Vol. (%) | Fiber Wt. (%) | Density of Composite (lbs/in³) | Interlaminar Shear Strength (psi) | Flexual** Strength (ksi) |
|---|---|---|---|---|---|---|---|---|
| | 1* | SPGE*** | 1.1 | 53.0 | 69.5 | .0581 | 9400 | 188 |
| | 2 | Polyvinylpyrrolidone | 1.8 | 54.9 | 72 | ND | 6200 | 148 |
| | 3 | Phenoxy | 0.9 | 54.9 | 72 | ND | 6300 | 175 |
| | 4 | DGEBA | 1.1 | 55.7 | 73 | .0544 | 8100 | 203 |
| | 5* | PAPI TM 580 | 0.83 | 56.7 | 74.3 | .0584 | 8500 | 184 |
| Control | 6 | None | 0 | 53.4 | 70 | .0559 | 5000 | 154 |

SPGE = Sorbitol polyglycidyl ether.
DGEBA = Diglycidyl ether of Bisphenol A.
*These runs are within the scope of the invention.
**Fiber volume normalized to 62% in expressing results.
***SPGE obtained from Example 1, run 2.

The principles, preferred embodiments and modes of operation of the present invention have been described

* * * * *